United States Patent [19]
Bartlett et al.

[11] Patent Number: 5,539,834
[45] Date of Patent: Jul. 23, 1996

[54] BAFFLED MICROPHONE ASSEMBLY

[75] Inventors: Charles S. Bartlett, Clinton, Md.; Michael A. Zuniga, Fairfax, Va.

[73] Assignee: AT&T Corp., Murray Hill, N.J.

[21] Appl. No.: 333,671

[22] Filed: Nov. 3, 1994

[51] Int. Cl.$^6$ ................................................ H04R 25/00
[52] U.S. Cl. ......................... 381/170; 381/168; 381/155
[58] Field of Search .................................. 381/155, 168, 381/169, 170, 71, 157, 154; 379/428, 433

[56] References Cited

U.S. PATENT DOCUMENTS

| 4,584,702 | 4/1986 | Walker, Jr. . |
| 4,773,091 | 9/1988 | Busche et al. . |
| 4,850,016 | 7/1989 | Groves et al. . |

OTHER PUBLICATIONS

"Second-Order Gradient Noise Canceling Microphone," A. J. Brouns, *IEEE International Conference on Acoustics, Speech, and Signal Processing*, CH1610-5/81 (May 1981), pp. 786–789.

"A Second-Order Gradient Noise Canceling Microphone Using a Single Diaphragm," W. A. Beaverson and A. M. Wiggins, *J. Acoust. Soc. Am.*, vol. 22, No. 5, Sep. 1950, pp. 592–601.

"Adaptive Noise Cancelling: Principles and Applications," B. Widrow et al., *Proc. IEEE 63*, Dec. 1975, pp. 1692–1716.

"Second Order Gradient Uni-Directional Microphones Utilizing an Electret Transducer," G. M. Sessler and J. E. West, *J. Acoust. Soc. Amer.*, vol. 58, 1975, pp. 273–278.

"Autodirective Microphone System," J. L. Flanagan et al., *Acustica*, vol. 73, 1991, pp. 58–71.

*Primary Examiner*—Curtis Kuntz
*Assistant Examiner*—Huyen D. Le
*Attorney, Agent, or Firm*—Martin I. Finston

[57] ABSTRACT

A second-order differential (SOD) microphone includes a first-order differential (FOD) microphone element installed in a housing. A pair of front sound conduits extend from respective ports to a chamber on the front side of the microphone diaphragm, and a pair of rear sound conduits extend from respective ports to a chamber on the rear side of the microphone diaphragm. The two front ports and the two rear ports are all substantially collinear along a minor axis, with the rear ports intermediate the front ports or the front ports intermediate the rear ports. The respective acoustic transfer functions from each port to the microphone diaphragm are equivalent. The microphone response is approximately proportional to the second spatial derivative, along the minor axis, of a sample acoustic pressure field.

8 Claims, 6 Drawing Sheets

ROTATED DOWN 20°

BAFFLED MICROPHONE ASSEMBLY

FIELD OF THE INVENTION

This invention relates to microphone assemblies that are arranged to respond to second-order, spatial derivatives of the acoustic pressure field in order to reject background noise. More particularly, this invention relates to such microphone assemblies when they are adapted for use in communication devices such as telephone handsets.

BACKGROUND OF THE INVENTION

Second order differential (SOD) microphones have long been recognized for their superior noise cancelling performance relative to first order differential (FOD) or zero order differential (pressure) microphones. Early workers conceived making a SOD microphone by combining the outputs of two FOD microphones, or by combining the outputs of three or four pressure microphones. Such an approach requires the use of microphones whose amplitude and phase responses are very well matched.

Before electret microphones became available, typical off-the-shelf microphones did not exhibit the required match in amplitude and phase responses. Consequently, to produce a working SOD microphone with the then-existing technology, it was necessary to use a single diaphragm with four distinct ports arranged to communicate equivalently with the diaphragm. Single diaphragm SOD microphones were designed and built using, for example, either a moving coil or piezoelectric transducer mounted within an enclosure having sound ports to spatially sample the sound field. (See, for example, A. J. Brouns, "Second-Order Gradient Noise-Cancelling Microphone," *IEEE International Conference on Acoustics, Speech, and Signal Processing* CH1610-5/81 (May 1981) 786–789, and W. A. Beaverson and A. M. Wiggins, "A Second-Order Gradient Noise Canceling Microphone Using a Single Diaphragm," *J. Acoust. Soc. Am.* 22 (1950) 592–601.)

In some implementations, for example, the ports were placed symmetrically, at the four corners of a square, around the FOD microphone to ensure that the acoustic response of the diaphragm to each of the ports was identical. These single diaphragm SOD microphones produced an output signal proportional to the biaxial second order derivatived $^2/dxdy$ of the sound pressure field.

A later implementation, described in G. M. Sessler, and J. E. West, "Second order gradient uni-directional microphones utilizing an electret transducer," *J. Acoust. Soc. Amer.* 58 (1975) 273–278, incorporated an electret microphone element in a single diaphragm SOD microphone. Specifically, an experimental unidirectional SOD microphone was fabricated using an electret microphone into which tubes were inserted to sample the sound field at discrete points along an axis. (By "unidirectional" is meant that the microphone far-field sensitivity pattern is distinctly peaked in a preferred direction.) The tube lengths and their positions in the front and rear cavities of the electret microphone were chosen to produce the desired unidirectional far-field response.

In order to achieve the desired second-order behavior, it was necessary to precisely tune the Helmholtz resonances of the cavities and the sensing tubes. The effort involved in this tuning operation detracted from the practicality of mass producing this SOD microphone.

We have found that when a SOD microphone is configured to produce an output signal proportional to the uniaxial second order derivative $d^2/dx^2$ instead of the biaxial derivative of the sound pressure field, it can take better advantage of the spherical wave nature of a speaker's voice field to maximize sensitivity to the speaker's voice. This property is discussed, for example, in a co-pending United States patent application filed by C. Bartlett and M. Zuniga on Apr. 21, 1994 under the title, "Noise-Canceling Differential Microphone Assembly," application Ser. No. 08/230,955, and in a co-pending United States patent application filed by C. Bartlett and M. Zuniga on May 4, 1994 under the title, "Single Diaphragm Second Order Differential Microphone Assembly," application Ser. No. 08/237,798.

Practitioners in the field of microphone design have hitherto failed to provide a single diaphragm SOD microphone that is easy to mass produce, and that has an output proportional to a uniaxial second order derivative $d^2/dx^2$ of the acoustic pressure field.

SUMMARY OF THE INVENTION

We have invented an improved, single-diaphragm, SOD microphone that responds to a speaker's voice in a manner substantially like that of an omnidirectional microphone, yet responds to far field noise in a manner substantially like that of a second order differential microphone. Consequently, the response of our inventive SOD microphone is much less sensitive to distance from the user's lips than prior art SOD microphones. In addition, our SOD microphone is readily mass produced. In particular, it includes an enclosure into which a commercially available FOD microphone element, such as an electret microphone element, is readily inserted without the need for penetrating the casing of the microphone element as provided by the commercial supplier.

Within the aforementioned enclosure containing the FOD microphone element, a front cavity is defined adjacent the front side of the FOD microphone diaphragm, and similarly, a rear cavity adjacent the rear side of the diaphragm. A pair of conduits, referred to as "front conduits", conduct acoustic energy from respective first and second front ports to the front cavity, and similarly, a pair of rear conduits conduct acoustic energy from respective first and second rear ports to the rear cavity. The conduits and ports are defined within a slab-like member, referred to hereinafter as the "baffle". The baffle has opposing, substantially planar principal surfaces to be referred to, respectively, as the "front side" and the "rear side". The front ports are defined on the front side, and the rear ports are defined on the rear side. Thus, the front ports primarily admit, to their respective conduits, acoustic energy that is incident on the front side, and the rear ports primarily admit, to their respective conduits, acoustic energy that is incident on the rear side.

The four ports (i.e., the two front and two rear ports) are approximately equivalent in their acoustic characteristics, and are typically of approximately equal dimensions. Although defined in two distinct surfaces, as noted above, all four ports are intercepted by a common plane perpendicular to the front and rear sides. Lines lying within this plane and parallel to the front and rear sides will be referred to hereinafter as being parallel to the "minor axis."

When projected onto a common plane, the front ports lie intermediate the rear ports, or the rear ports lie intermediate the front ports. The distance between the first front port and the nearest rear port thereto is approximately the same as the distance between the second front port and the nearest rear port thereto.

The four conduits have equivalent lengths and cross-sectional areas, and they meet their respective cavities in an acoustically equivalent manner. The cavity, conduit, and port dimensions are such that the acoustical system consisting of the microphone, cavities, conduits, and ports has no more than one acoustic resonant frequency less than 3500 Hz, and no Helmholtz resonant frequency less than 3500 Hz.

In use, the inventive SOD microphone is positioned such that the front side of the baffle faces the user's lips. Thus, the sound field corresponding to the user's voice impinges directly upon the front ports, whereas the baffle shields the rear ports from the user's voice. As a consequence, the output of the microphone (in response to a user's voice) is approximately proportional to the sum of the acoustic pressure fields at the two front ports. This leads to response characteristics like those of an onmidirectional microphone.

On the other hand, ambient noise tends to be diffuse in nature, and to arrive at the microphone ports from all directions. Therefore, the baffle is relatively ineffective for shielding the ports, on one side or the other, relative to sound fields corresponding to ambient noise incident from most directions. As a consequence, the output of the microphone, in response to ambient noise, is approximately proportional to the second-order, uniaxial derivative of the sound field along the minor axis.

The inventive microphone is readily made to exhibit this distinction between voice response and noise response over a useful acoustic frequency range, such as the telephone band of about 300 Hz–3500 Hz.

DETAILED DESCRIPTION OF THE INVENTION

Figure 1:
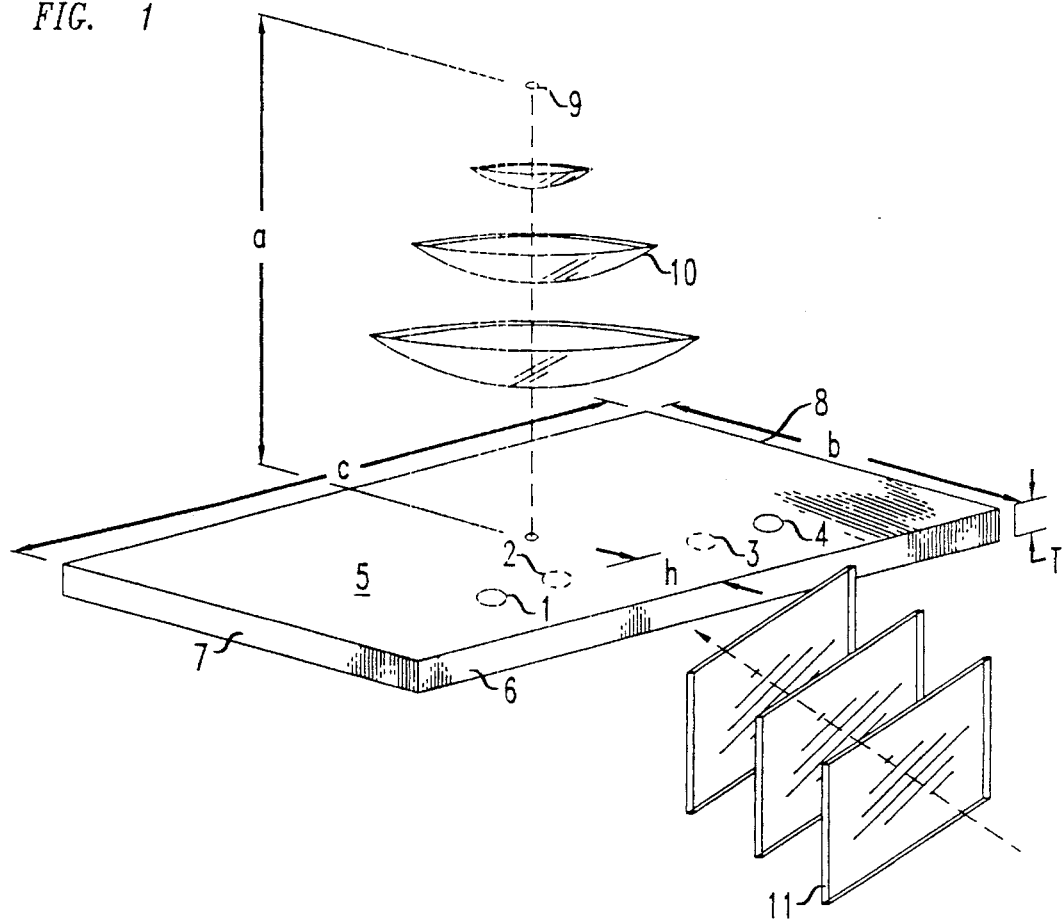
FIG. 1 is a schematic representation of an array of microphones situated adjacent an acoustic baffle. Also represented in the figure are an incident plane wave and an incident spherical wave.

The underlying principles of our improved SOD microphone can be understood in terms of a theoretical model, illustrated in FIG. 1. This figure is intended for pedagogical purposes and not as a realistic representation of our invention. As shown in the figure, a coplanar array of onmidirectional microphones 1–4 is arranged adjacent an acoustically rigid, slab-like baffle 5. As viewed in the figure, microphones 1 and 4 adjoin the front :side, and microphones 2 and 3 adjoin the rear side of the baffle. The arrangement of these microphones is similar to the arrangement of ports described above. The microphones are all situated a distance h from edge 6 of the baffle. The distance h lies typically in the range 1.5–13 mm. In our prototypes, we have gotten excellent performance when h lay in the range 3–6 mm.

The spacing between microphones 1 and 2 is equal to that between microphones 3 and 4. This spacing is much less than a wavelength at the highest frequency of interest. For applications in telephony, this frequency is typically about 3500 Hz, the corresponding wavelength is about 10 cm, and a desirable spacing between microphones is less than about one-tenth of a wavelength, or about 1 cm.

In our prototypes, we placed the ports corresponding to the locations of end microphones 1 and 4 a distance of h, or slightly more, from edges 7 and 8, respectively. However, we believe that greater distances are also acceptable.

The thickness T of the baffle should be much less than a wavelength at the highest frequency of interest. (Generally, a thickness less than one-tenth of a wavelength will be effective.)

In this model, the voice of a human user of the microphone is represented as the sound field from a point source 9 situated a distance $\alpha$ (as shown in the figure) above the front surface of the baffle. In practical embodiments of the invention, a is typically 2.5–7.5 cm. The net pressure distribution on the baffle will be the sum of contributions from the user's voice (represented symbolically in the figure as spherical wavefronts 10) and contributions from diffuse noise. Diffuse noise from distant sources can be represented theoretically as a sum of plane waves, with random amplitudes and phases, that are incident from many directions. Noise incident from a particular direction is represented symbolically in the figure as planar wavefronts 11.

Let P1, P2, P3, and P4 respectively stand for the acoustic pressure values at microphones 1–4. Then the sum of the rear microphone outputs, subtracted from the sum of the front microphone outputs, gives a difference that is proportional to the quantity $$\text{DELTA2}=[(P1+P4)-(P2+P3)]=[(P1-P2)-(P3-P4)].$$

Let k represent the acoustic wavenumber $2\pi/\lambda$, where $\lambda$ is the wavelength in air. Then in the case of incident plane waves for which $kh \ll 1$, the front and rear microphones will, to an excellent approximation, experience the same acoustic pressure that would obtain if the baffle were not there.

Consequently, the output function DELTA2 will respond to diffuse noise, at sufficiently great wavelengths, in proportion to a second-difference approximation of the uniaxial second derivative of the acoustic pressure field.

However, unlike diffuse noise, the user's voice field is more appropriately modeled as an incident spherical wave, rather than an incident plane wave (at each frequency of interest). The above-described property does not apply to the user's voice. Instead, the baffle will tend to shield the rear microphones from the user's voice, and the resulting acoustic pressures at the rear microphones will, in consequence, be much smaller than those at the front microphones.

Consequently, the output function DELTA2 will respond to the user's voice field in approximate proportion to the sum of the front-microphone pressures P1 and P4.

As described in detail below, the inventive SOD microphone is designed to put into practical application the principles described above. Thus, with respect to a user's voice, the inventive SOD microphone responds approximately like an onmidirectional microphone, but with respect to far-field noise, it responds like a second order differential microphone, over a frequency band of interest.

Figure 2:
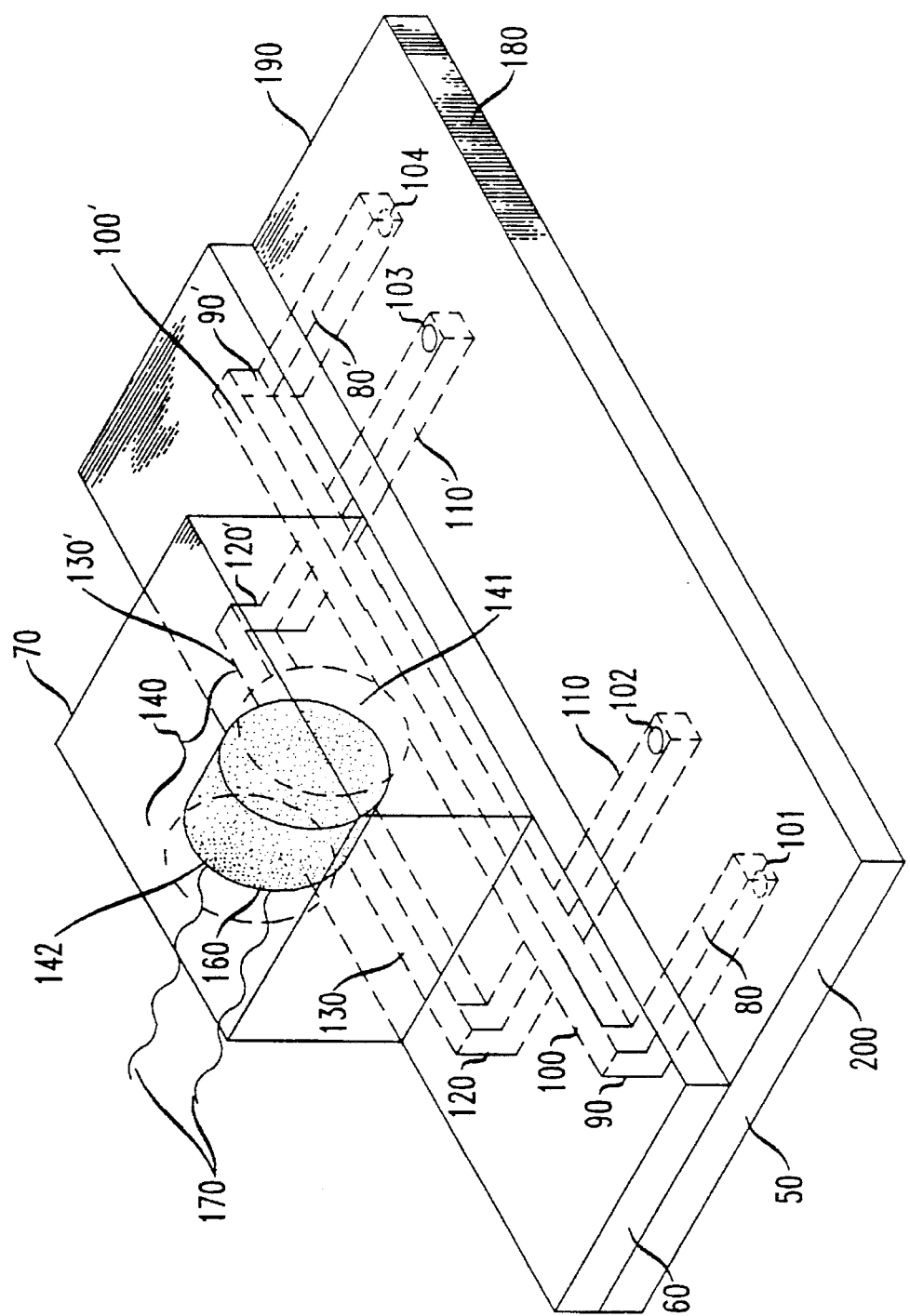
FIG. 2 is a simplified, perspective view of the invention in one embodiment. For clarity of presentation, the orientation of the microphone in FIG. 2 is inverted relative to FIGS. 1 and 3.

Practical implementations of the inventive microphone are readily made using a single microphone diaphragm. By way of example, reference is now made to a currently preferred embodiment of our invention, as depicted in FIG. 2.

As shown, the baffle comprises slab-like base members 50 and 60, which are formed from acoustically rigid material such as PMMA, phenolic or hard rubber. The first of two front ducts comprises transverse duct portion 80, rising duct portion 90, and longitudinal duct portion 100 formed in the base members, and the second front duct comprises corresponding duct portions 80', 90', and 100'. Similarly, the first of two rear duct portions comprises transverse duct portion 110, rising duct portion 120, and longitudinal duct portion 130, and the second rear duct portion comprises corresponding duct portions 110', 120', and 130'.

The exemplary microphone further comprises a housing 70 made from a suitable, acoustically rigid material. Defined within this housing is a cylindrical cavity 140. Insertion of FOD microphone element 160 into this cavity subdivides the remaining space within the cavity into a front cavity 141 and a rear cavity 142. It is desirable for the microphone element to make an acoustically tight seal against the inner wall of the housing. To effect such a seal, it will often be convenient to use a mounting element such as a rubber ring (not shown).

Each duct terminates at the front or rear cavity, as appropriate. The opposite end of each duct terminates in a respective one of ports 101–104 for admitting sampled acoustic energy. Ports 101 and 104 are on, e.g., the front side of member 50, whereas ports 102 and 103 are on, e.g., the rear side of member 50.

The centers of ports 101–104 desirably lie within a common plane that is perpendicular to the front and rear baffle surfaces, and that extends along the minor axis (as defined above). Thus the ports form a two-dimensional array.

As shown, the front ports occupy the extremal positions of the array (as viewed along the minor axis), and the rear ports occupy the intermediate positions. Alternatively, the rear ports may be extremal, and the front ports, intermediate. The distance between ports 101 and 102 should equal the distance between ports 103 and 104, within practical tolerances, in order for the microphone to function as a SOD microphone with respect to far-field noise. In addition, as mentioned above, the ports should all be separated from edge 180 by at most the distance h, and ports 101 and 104 are desirably separated from edges 200 and 190, respectively by at least h.

Within practical tolerances, the sound ducts should be of equal cross sectional area and length, the ports should be of equal area, and the cavities 141 and 142 should be of equal volume. The transverse dimensions of the ducts and port diameters should be much less than a wavelength of sound at the highest frequency of interest (exemplarily, less than one-tenth of a wavelength).

The duct lengths and the volumes of cavities 141 and 142 are readily chosen such that at most one acoustic resonance occurs at a frequency less than 3500 Hz. In fact, it will often be possible to exclude all acoustic resonances within the telephone band.

In a microphone built to these specifications, the acoustic transfer function from each port to the diaphragm is, at least in a practical sense, the same. As a consequence, microphone 160 produces a signal output at electrical leads 170 that is proportional to the net pressure difference across the front and rear diaphragm faces. That is, in general.

$$DIFF2 = K(\omega)[(P1+P4)-(P2+P3)]$$

where $K(\omega)$ is the frequency dependent acoustic transfer function from the ports to the diaphragm. Thus, in accordance with the theoretical discussion, above, the output of the microphone in response to the user's voice field is approximately proportional to the sum of the acoustic pressures at the front ports, according to $$K(\omega)(P1+P4),$$

whereas, in response to far-field noise, the output is approximately proportional to the uniaxial second-order derivative of the acoustic pressure field along the minor axis.

It should be noted that by passing the electrical output of the microphone element through an electronic, frequency-shaping filter, it is possible to modify the frequency dependence associated with the transfer function $K(\omega)$, for example to create a net transfer function that is effectively flat over the telephone band.

EXAMPLE

Figure 3:
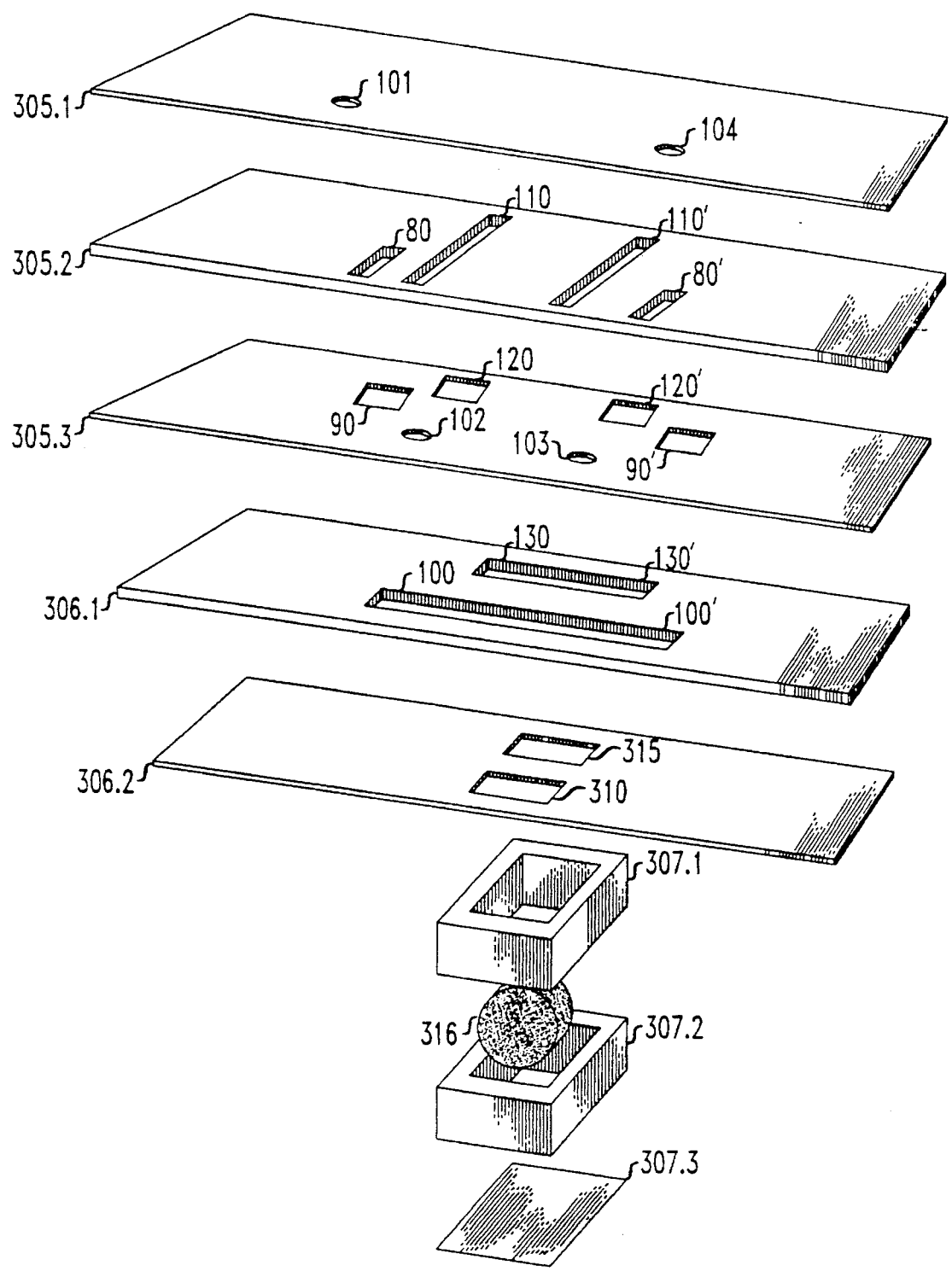
FIG. 3 is an exploded view of the inventive microphone in an easily manufacturable embodiment.

We have fabricated a laboratory prototype of our SOD microphone which is shown in FIG. 3. In this exemplary embodiment, member 50 consists of three parts: sheet 305.2 of 0.035-inch polymethyl methacrylate (PMMA) with transverse duct portions 80, 80', 110, and 110' defined therein; and bonded to sheet 305.2, sheets 305.1 and 305.3 of 0.005-inch brass. Defined in sheet 305.1 are ports 101 and 104, and defined in sheet 305.3 are ports 102 and 103. Also defined in sheet 305.3 are rising duct portions 90, 90', 120, and 120'.

In this embodiment, member 60 consists of two parts: sheet 306.1 of 0.035-inch PMMA, and bonded to sheet 306.1, sheet 306.2 of 0.005-inch brass. Longitudinal duct portions 100 and 100' are defined as respective ends of a single, continuous channel formed in sheet 306.1, and longitudinal duct portions 130 and 130' are defined as respective ends of a second, continuous channel formed in the same sheet. Slot 310 in sheet 306.2 admits acoustic energy from duct portions 100 and 100' to one side of the microphone diaphragm, and slot 315 in the same sheet admits acoustic energy from duct portions 130 and 130' to the other side of the microphone diaphragm.

In this embodiment, FOD microphone housing 70 consists of three pans: upper and lower rectangular wall components 307.1 and 307.2, and capping sheet 307.3. The wall components are made from PMMA, and the capping sheet is made from 0.005-inch brass. The capping sheet is bonded to wall component 307.2 to acoustically seal the FOD microphone housing. A mounting element (not shown in the figure) for FOD microphone element 316 was made from silicone rubber.

The illustrative embodiment described above was made to the following dimensions: total length, 50 mm; width of pan 305.2, 20 mm; width of part 306.1, 12 mm; port diameter, 3 mm; center-to-center lateral offset between adjacent front and rear ports, 5 mm; center-to-center separation between extremal ports, 20 mm; duct width, 3 mm; longitudinal duct lengths, 16 mm and 26 mm; transverse duct lengths, 10 mm and 15 mm; rising duct portions, 3 mm×3 mm; centerline-to-centerline separation between longitudinal duct portions, 5 mm; distance from port centers to nearest edge, 4.5 mm; distance from the center of each extremal port to the nearest transverse edge, 13.5 mm; slots in part 306.2, 2.5 mm×6 mm; inside, lateral dimensions of the microphone housing, 6 mm×8 mm; microphone diameter (including the mounting element), 6 mm; height of each microphone-housing wall component, 3 mm.

Figure 4:
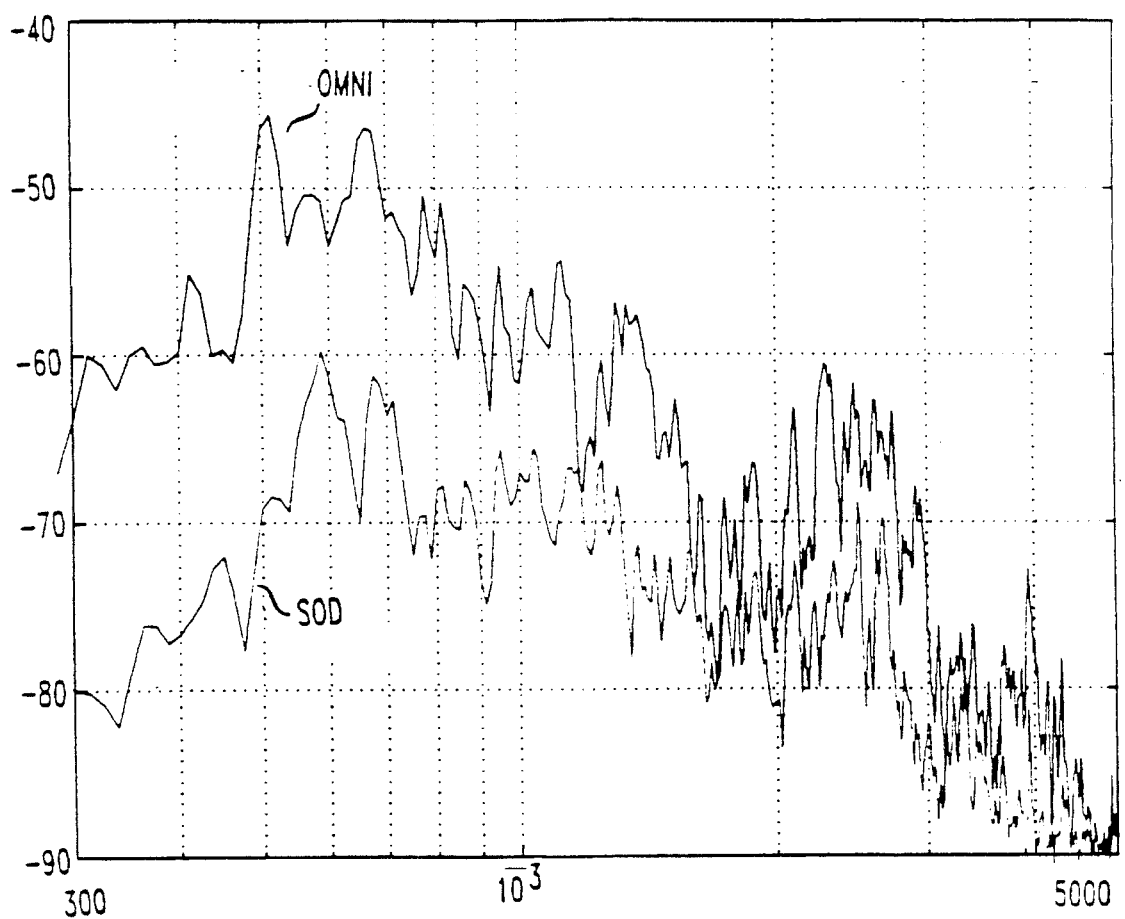
FIG. 4 is a graph of microphone response versus frequency. Compared in this graph are the respective responses of the inventive microphone and an onmidirectional microphone to ambient, far-field noise.

Compared in FIG. 4 are the respective responses of the inventive SOD microphone and a typical, onmidirectional microphone, to ambient far-field noise. The test conditions simulate the mounting of each microphone type on a portable cellular telephone handset. An electronic filter has been used with the SOD microphone to match its (spectral) voice response to that of the onmidirectional microphone when the cellular handset is held in normal speaking position (which is defined, herein, as the position of 0 degrees rotation). It is apparent from the figure that relative to the onmidirectional microphone, the SOD microphone achieves a noise reduction of 10 dB or more over much of the telephone band.

Figure 5:
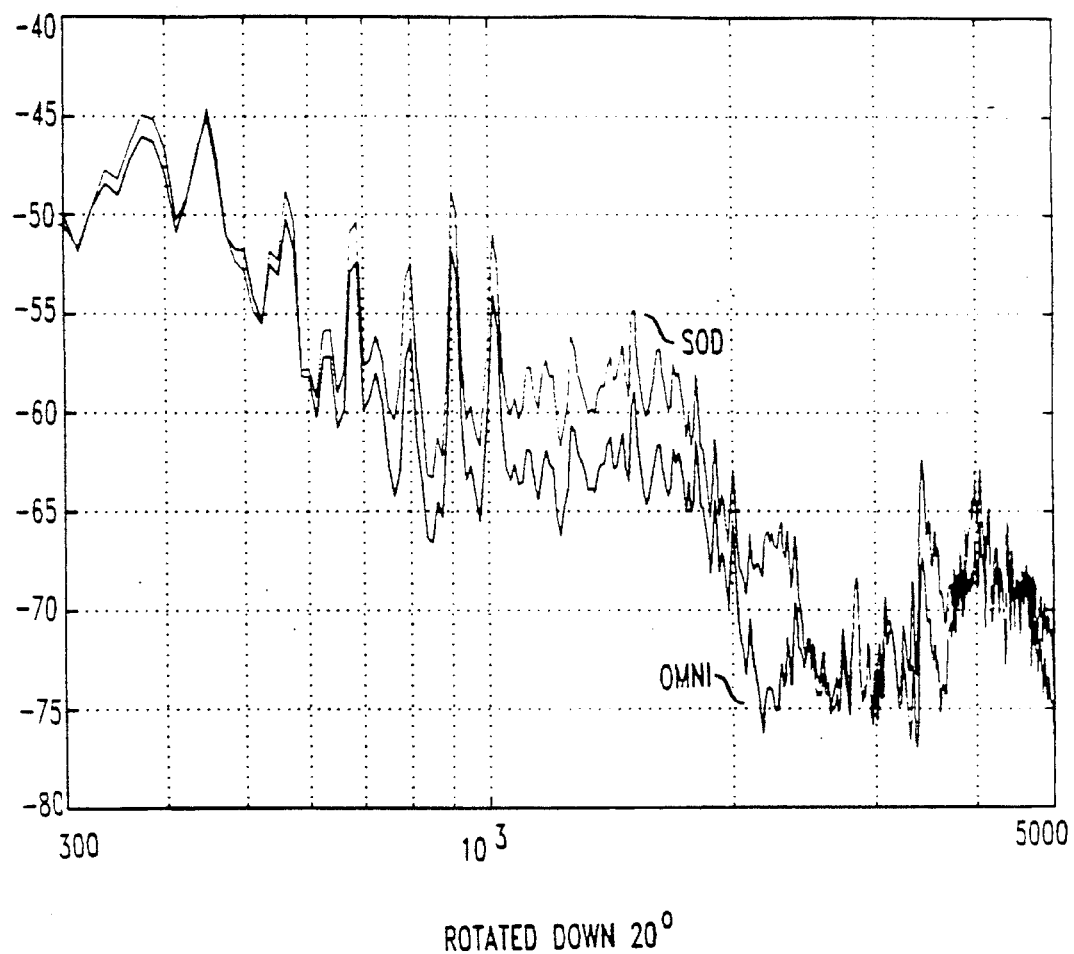
FIG. 5 is a graph of the voice responses of the microphones of FIG. 4 when each microphone is mounted on a cellular telephone handset that is rotated downward by about 20 degrees.

Compared in FIG. 5 are the respective responses of the same microphone types when each microphone is mounted on a cellular telephone handset that is rotated downward by about 20 degrees. (By a "downward" rotation is meant the rotation that would take place if an ordinary telephone handset, in use, were pivoted about the user's ear so as to shift the microphone from the user's mouth toward the user's chin.)

In this rotated position, the distance from the center of the user's lips to the center of the inventive SOD microphone (i.e., midway between the ports facing the user's lips) is about 3 inches. As is evident from the figure, there is no substantial difference between the respective voice responses of the microphones over the telephone band.

Figure 6:
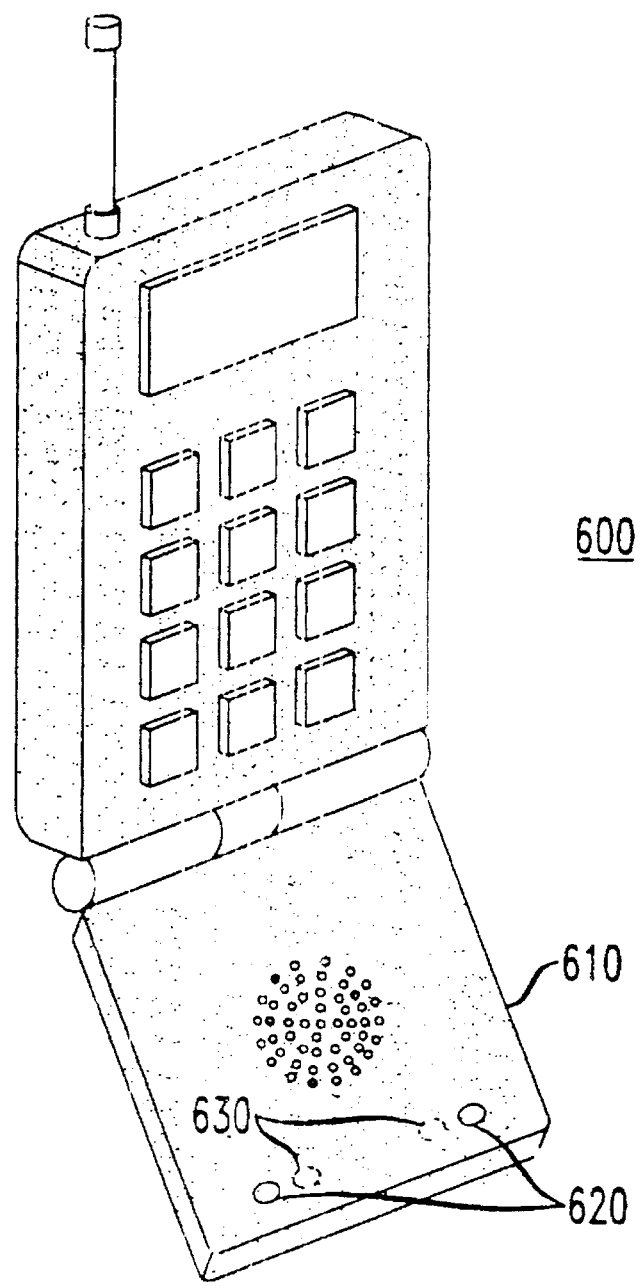
FIG. 6 is a partially schematic view of a cellular telephone handset incorporating the inventive microphone.

FIG. 6 depicts an illustrative cellular telephone handset 600 incorporating the inventive microphone 610. Indicated in the figure are front ports 620 and rear ports 630.

We claim:

1. Apparatus comprising:
   a) a housing;
   b) mounted within the housing, a first-order differential microphone having a diaphragm, the diaphragm having a front side and a rear side;
   c) defined within the housing, a front cavity adjacent the front side of the diaphragm, and a rear cavity adjacent the rear side of the diaphragm;
   d) a first and a second front conduit for conducting acoustic energy from respective first and second front ports to the front cavity; and
   e) a first and a second rear conduit for conducting acoustic energy from respective first and second rear ports to the rear cavity, wherein:
   f) each of said ports has equivalent cross-sectional area, each of said cavities has equivalent volume, and each of said conduits has equivalent length and cross-sectional area and meets its respective cavity in an acoustically equivalent manner, such that each of said conduits has an equivalent acoustic transfer function from its respective port to the diaphragm;

CHARACTERIZED IN THAT g) the cavity volume, the conduit length and cross-sectional area, and the port cross-sectional area are adapted such that the acoustical system consisting of the microphone, cavities, conduits, and ports has no more than one acoustic resonant frequency less than 3500 Hz, and no Helmholtz resonant frequency less than 3500 Hz;
   h) the first and second front ports and the first and second rear ports are all substantially collinear along an axis to be referred to as the minor axis; and
   i) said ports are arranged such that the rear ports are intermediate the front ports or the front ports are intermediate the rear ports, and each front port is separated an equal distance from the adjacent rear port, whereby the microphone response will be approximately proportional to the second spatial derivative, along the minor axis, of a sampled acoustic pressure field.

2. Apparatus of claim 1, wherein the microphone is an electret microphone.

3. Apparatus of claim 1, wherein the acoustical system has a frequency-dependent response function, and the apparatus further comprises an electronic filter for modifying said response function in a predetermined manner.

4. Apparatus of claim 1, wherein the housing comprises a body of acoustically rigid material, and each of said conduits is an elongated, hollow region defined by inner surfaces of said body.

5. Apparatus of claim 4, wherein:
   the body comprises a top layer having a substantially planar lower surface and a bottom layer having a substantially planar upper surface;
   at least one of the conduits comprises a channel formed in the bottom layer, said channel extending in one or two longitudinal dimensions substantially parallel to said upper surface and having a total length in the longitudinal directions;
   said channel extends from said upper surface to a depth, in the direction perpendicular to said upper surface, that is smaller than the total length; and
   the top layer overlies the bottom layer such that said upper and lower surfaces are in contact and the top layer forms an acoustically sealing cover for said channel.

6. Apparatus of claim 5, wherein each of the conduits comprises a channel formed in the bottom layer.

7. Apparatus of claim 5, wherein each of the conduits comprises a channel formed in the top layer interconnected to a channel formed in the bottom layer, the top layer forms an acoustically sealing cover for the channels formed in the bottom layer, and the bottom layer forms an acoustically sealing cover for the channels formed in the top layer.

8. Apparatus comprising a first-order differential microphone having front and rear faces, wherein the front face is in acoustic communication with first and second front acoustic conduits through a front cavity, the rear face is in acoustic communication with first and second rear acoustic conduits through a rear cavity, each conduit is terminated by a respective port for admission of acoustic energy, and the ports are so arranged that the response of the microphone will be approximately proportional to a second spatial derivative of a sampled acoustic pressure field, CHARACTERIZED IN THAT:
   a) the apparatus further comprises a slab-like base comprising an acoustically rigid material and having a substantially planar surface, to be referred to as the top base surface;
   b) a pattern of channels is formed in the base, wherein the pattern is defined by interior surfaces of the base, the channels are open at the top base surface, and the channels extend in at least one longitudinal direction substantially parallel to the top base surface;
   c) the pattern comprises four channels of equal length and cross sectional area, and each of said four channels is identified with a respective one of the acoustic conduits, so that the channels will be referred to, respectively, as the first and second front channels and first and second rear channels;
   d) the pattern further comprises a central cavity having a front end joined to the front channels and a rear end joined to the rear channels;

e) the microphone is mounted in the central cavity such that the portion of the central cavity unoccupied by the microphone is subdivided into mutually acoustically isolated front and rear portions of equal volumes, wherein: the front portion adjoins the front channels and the microphone front face, and is identified with the front cavity; and the rear portion adjoins the rear channels and the microphone rear face and is identified with the rear cavity;

f) each port is an opening in a surface of the base;

g) the ports are arranged substantially along a straight line, the rear ports are intermediate the front ports or the front ports are intermediate the rear ports, and each front port is distant by the same amount from its adjacent rear port, such that the second spatial derivative to be represented by the microphone response is a uniaxial derivative;

h) the apparatus further comprises a cover having a substantially planar surface, to be referred to as the bottom cover surface; and i) the bottom cover surface is affixed in contact with the top base surface such that the cover forms an acoustically sealing closure for the pattern of channels.

* * * * *